(12) United States Patent
Dinh

(10) Patent No.: US 7,462,777 B2
(45) Date of Patent: Dec. 9, 2008

(54) DUAL HINGE RECESS WEATHERPROOF ELECTRICAL BOX ASSEMBLY

(75) Inventor: Cong Thanh Dinh, Collierville, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 11/800,945

(22) Filed: May 8, 2007

(65) Prior Publication Data

US 2008/0110661 A1    May 15, 2008

Related U.S. Application Data

(60) Provisional application No. 60/858,978, filed on Nov. 14, 2006.

(51) Int. Cl.
*H01H 9/02* (2006.01)

(52) U.S. Cl. .............................. 174/58; 174/66; 174/67; 174/60; 174/64; 361/641; 439/136; 220/241

(58) Field of Classification Search .................. 174/66, 174/67, 135, 58, 53, 60, 64; 220/241, 242; 361/641; 439/136, 142, 147
See application file for complete search history.

(56) References Cited

U.S. PATENT DOCUMENTS

| 2,433,917 | A |   | 1/1948  | McCartney |
|-----------|---|---|---------|-----------|
| 4,059,327 | A |   | 11/1977 | Vann      |
| 4,265,365 | A |   | 5/1981  | Boteler   |
| 4,988,832 | A |   | 1/1991  | Shotey    |
| 5,171,939 | A |   | 12/1992 | Shotey    |
| 5,218,169 | A | * | 6/1993  | Riceman ..................... 174/67 |
| 5,245,507 | A | * | 9/1993  | Ericksen ..................... 361/641 |
| 5,280,135 | A |   | 1/1994  | Berlin et al. |
| 5,317,108 | A |   | 5/1994  | Prairie, Jr. |
| 5,470,138 | A | * | 11/1995 | Kump ..................... 312/34.4 |
| 5,763,831 | A |   | 6/1998  | Shotey et al. |
| 5,773,760 | A |   | 6/1998  | Stark et al. |
| 5,944,209 | A |   | 8/1999  | Daoud |
| 6,028,268 | A |   | 2/2000  | Stark et al. |
| 6,133,531 | A |   | 10/2000 | Hayduke et al. |
| 6,399,882 | B1 |  | 6/2002  | Faulkner et al. |
| 6,476,321 | B1 |  | 11/2002 | Shotey et al. |
| 6,700,063 | B2 |  | 3/2004  | Shotey et al. |
| 6,737,576 | B1 |  | 5/2004  | Dinh |
| 6,770,814 | B2 |  | 8/2004  | Shotey et al. |
| 6,806,426 | B1 |  | 10/2004 | Gretz |
| 6,891,104 | B2 |  | 5/2005  | Dinh |
| 6,894,223 | B1 |  | 5/2005  | Shotey et al. |
| 6,921,861 | B1 |  | 7/2005  | Gretz |
| 6,930,251 | B2 |  | 8/2005  | Shotey et al. |
| 6,956,169 | B1 |  | 10/2005 | Shotey et al. |
| 6,956,171 | B1 |  | 10/2005 | Gretz |
| 6,965,078 | B1 |  | 11/2005 | Gretz |
| 6,979,777 | B2 |  | 12/2005 | Marcou et al. |
| 6,987,225 | B2 |  | 1/2006  | Shotey et al. |

(Continued)

*Primary Examiner*—Dhiru R Patel
(74) *Attorney, Agent, or Firm*—Hoffmann & Baron, LLP

(57) ABSTRACT

The present invention concerns a dual hinge recess weatherproof outdoor electrical box assembly for shielding and protecting electrical components from moisture. The electrical box assembly includes an electrical box having a plurality of hinge sockets, an adapter plate that is recessed in the electrical box, and a cover having a plurality of hinge pins for operable engagement with the hinge sockets.

11 Claims, 6 Drawing Sheets

U.S. PATENT DOCUMENTS

| | | |
|---|---|---|
| 7,005,578 B2 | 2/2006 | Gretz |
| 7,064,271 B1 | 6/2006 | Gretz |
| 7,071,415 B1 | 7/2006 | Shotey et al. |
| 7,115,820 B1 | 10/2006 | Gretz |
| 7,151,219 B1 | 12/2006 | Gretz |
| 7,166,801 B1 | 1/2007 | Gretz |

* cited by examiner

DUAL HINGE RECESS WEATHERPROOF ELECTRICAL BOX ASSEMBLY

CROSS-REFERENCE TO RELATED APPLICATIONS

This application claims the benefit of U.S. Provisional Application No. 60/858,978 filed Nov. 14, 2006, the contents all of which are incorporated herein by reference.

FIELD OF THE INVENTION

The present invention generally relates to a hinged electrical box assembly, and more particularly to a dual hinge weatherproof electrical box assembly.

BACKGROUND OF THE INVENTION

Generally, electrical box assemblies are used for a variety of applications and provide a termination point for electrical wires for connection to an electrical component. Depending on the application and location, electrical box assemblies can be mounted on or in a wall in either a horizontal or vertical orientation. Once mounted, electrical wires are installed and connected to the electrical component. Typically, a face plate is provided that covers a top opening of the electrical box that may prevent damage to electrical components included therein.

Some electrical box assemblies include a cover that permits the box to be mounted in a location where it can be exposed to wet conditions. For example, some electrical boxes are mounted outdoors and provide electrical power for lighting and power equipment, even though the electrical box may be exposed to moisture.

Although some of these assemblies include a cover that can operate to inhibit some moisture from entering the box and causing damage, moisture remains a problem in that the electronic components are positioned adjacent the face plate. As such, there exists a need for an improved weatherproof outdoor box assembly. Furthermore, it would be desirable to provide an improved weatherproof dual hinge electrical box assembly that includes a cover which is adapted to be opened when the box is oriented in either the horizontal or vertical direction.

SUMMARY OF THE INVENTION

The present invention concerns a dual hinge recess weatherproof outdoor electrical box assembly for shielding and protecting electrical components from moisture. The electrical box assembly includes an electrical box having a plurality of hinge sockets, an adapter plate that is recessed in the electrical box, and a cover having a plurality of hinge pins for operable engagement with the hinge sockets.

The adapter plate of the present invention is substantially planar, and includes a perimeter bounded by a substantially rectangular side edge. Preferably, the adapter plate is recessed inside the outlet box and includes at least one aperture for receiving an electrical component. The adapter plate may include one or more tabs that extend from a back surface of the adapter plate and engage a back portion of the box. Upon engagement with the back portion of the box, the adapter plate is removably secured to the box.

The electrical box includes a face plate having a first hinge socket and a second hinge socket each extending respectively from a side edge of the box and are configured in a substantially orthogonal orientation. The electrical box also includes at least one knockout for receiving and attaching an electrical wire to an electrical component. For example, in one preferred embodiment, a bottom portion of the electrical box includes a V-shaped slot that is adapted to receive electrical wires for attachment to electrical components. In another embodiment, a back wall of the electrical box includes one or more knockouts that are adapted to receive electrical wires for attachment to an electrical component. In yet other embodiments, both the V-shaped slot and the back wall knockouts are included on the electrical box.

The cover of the present invention includes a front wall, an opposed open end and a substantially rectangular side wall defining a cover interior. Preferably, the side wall includes a rim bounding the open end. The cover also includes at least one access port through the side wall adjacent the open end for providing separate passageways into the interior of the cover. For example, an electrical cord may be set in each of the separate passageways.

Preferably, the cover includes a first hinge pin and a second hinge pin extending respectively from the side wall adjacent the open end in substantially orthogonal orientation; and the cover being pivotally affixed to the box by operative engagement of the hinge socket with the hinge pin of corresponding orientation and movable between an open and a closed position and wherein the hinge pin and the hinge socket that are not in operative engagement are not aligned.

BRIEF DESCRIPTION OF THE DRAWINGS

Like reference symbols in the various drawings indicate like elements.

DETAILED DESCRIPTION OF THE PREFERRED EMBODIMENT

Figure 1:
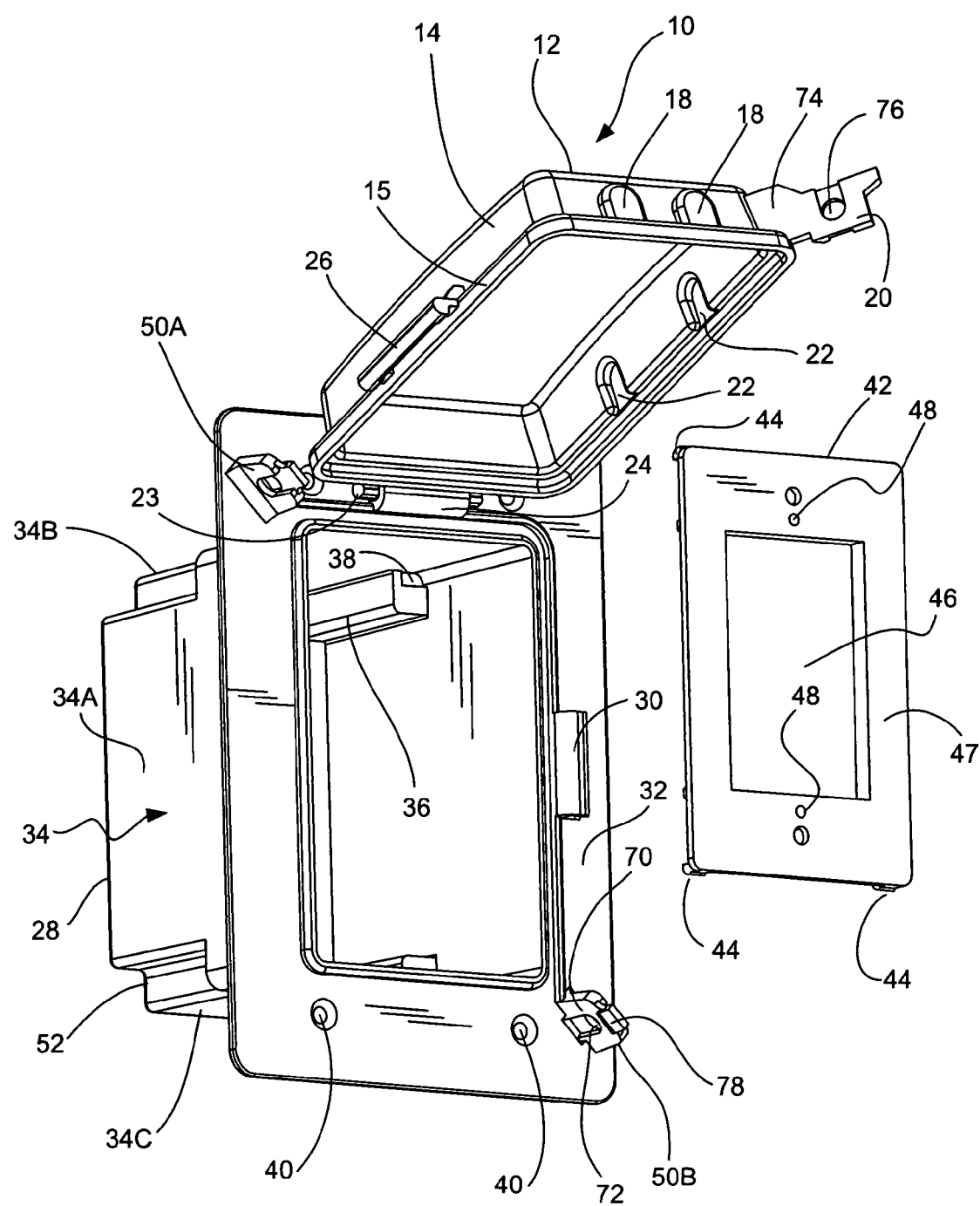
FIG. 1 is a perspective view of the electrical connector box and attached cover in a vertical open position, the adapter plate being shown detached from the electrical connector box.

Referring now to FIGS. 1-6, an electrical box assembly 10 according to the present invention is disclosed. The electrical box assembly 10 includes an electrical connector box 28 having a face plate 32 attached thereto, a box cover 12 removably attached to the face plate 32, and an adapter plate 42 that is removably secured to a recessed inside portion of the electrical connector box 28.

The electrical connector box 28 of the present invention is a generally rectangular box-like member that includes a generally flat backwall 29 (see FIG. 6) with a continuous sidewall member (indicated generally at 34) upstanding therefrom. The sidewall member 34 includes a pair of oppositely disposed endwall portions 34B, 34C and a pair of oppositely disposed sidewall portions 34A, 34D. The front edges of the endwall portions 34B, 34C and sidewall portions 34A, 34D preferably define a generally planar open front for the electrical connector box 28.

Figure 6:
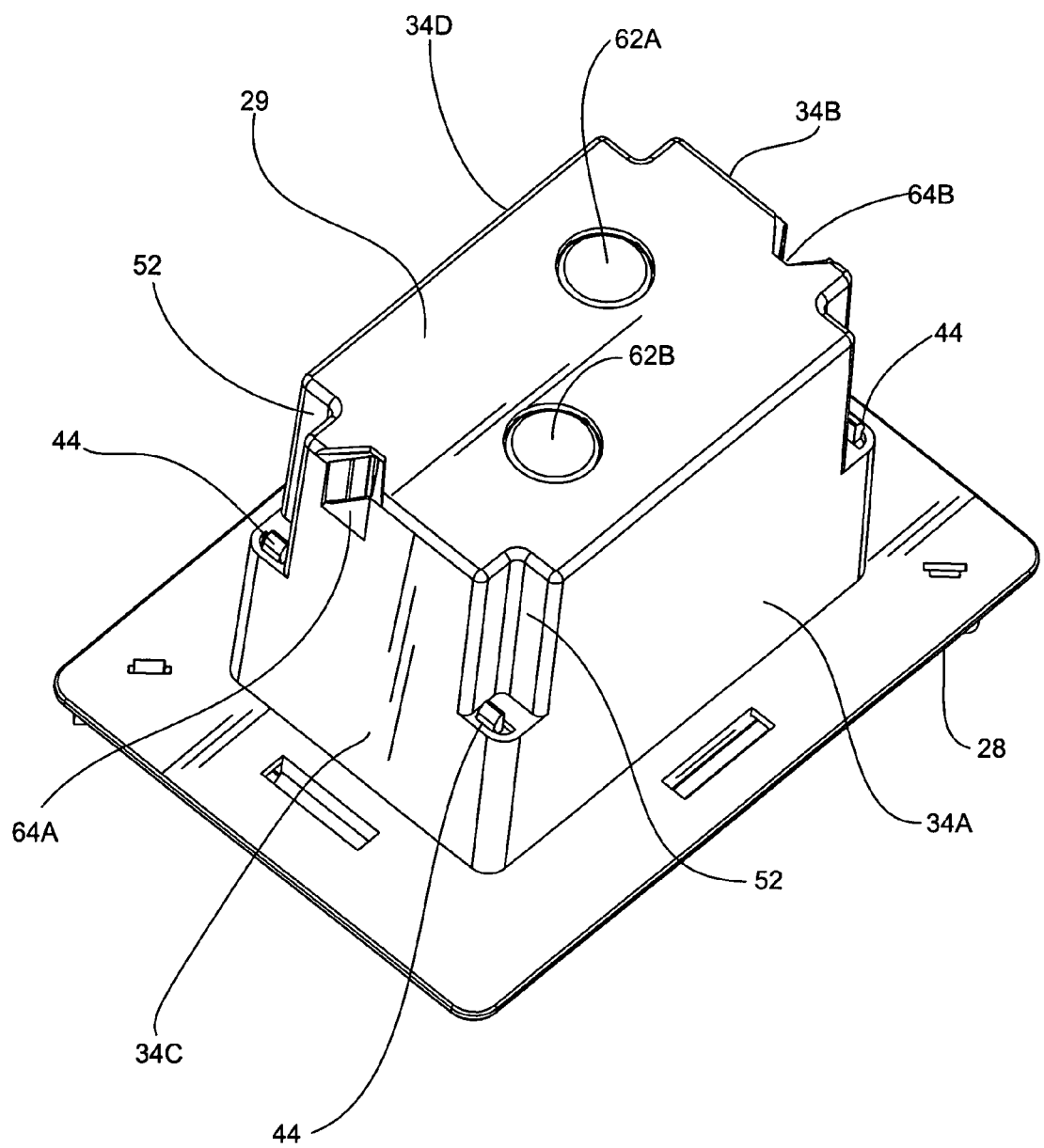
FIG. 6 is a rear perspective view of the electrical connector box.

As shown in FIG. 6, the back wall 29 of the electrical connector box 28 includes one or more knockouts 62A, 62B for receiving and attaching an electrical wire to an electrical component installed in the box 28. In one preferred embodiment, the electrical connector box 28 includes one or more a V-shaped slots 64A, 64B that also may be adapted to receive electrical wires for attachment to electrical components positioned in the box 28. Preferably, as shown in FIG. 6, the V-shaped slots 64A, 64B are formed on the back wall 29 and end wall portions 34B, 34C of the box 28. Of course, it will be appreciated by one skilled in the art that one or more knockouts and V-shaped slots may be included on the electrical connector box 28.

As shown in FIG. 6, in one preferred embodiment, the back edges of the endwall portions 34B, 34C are preferably joined to sidewall portions 34A, 34D, respectively, to define a recess area 52 that provides clearance for one or more tabs 44 extending from the adapter plate 42.

Figure 2:
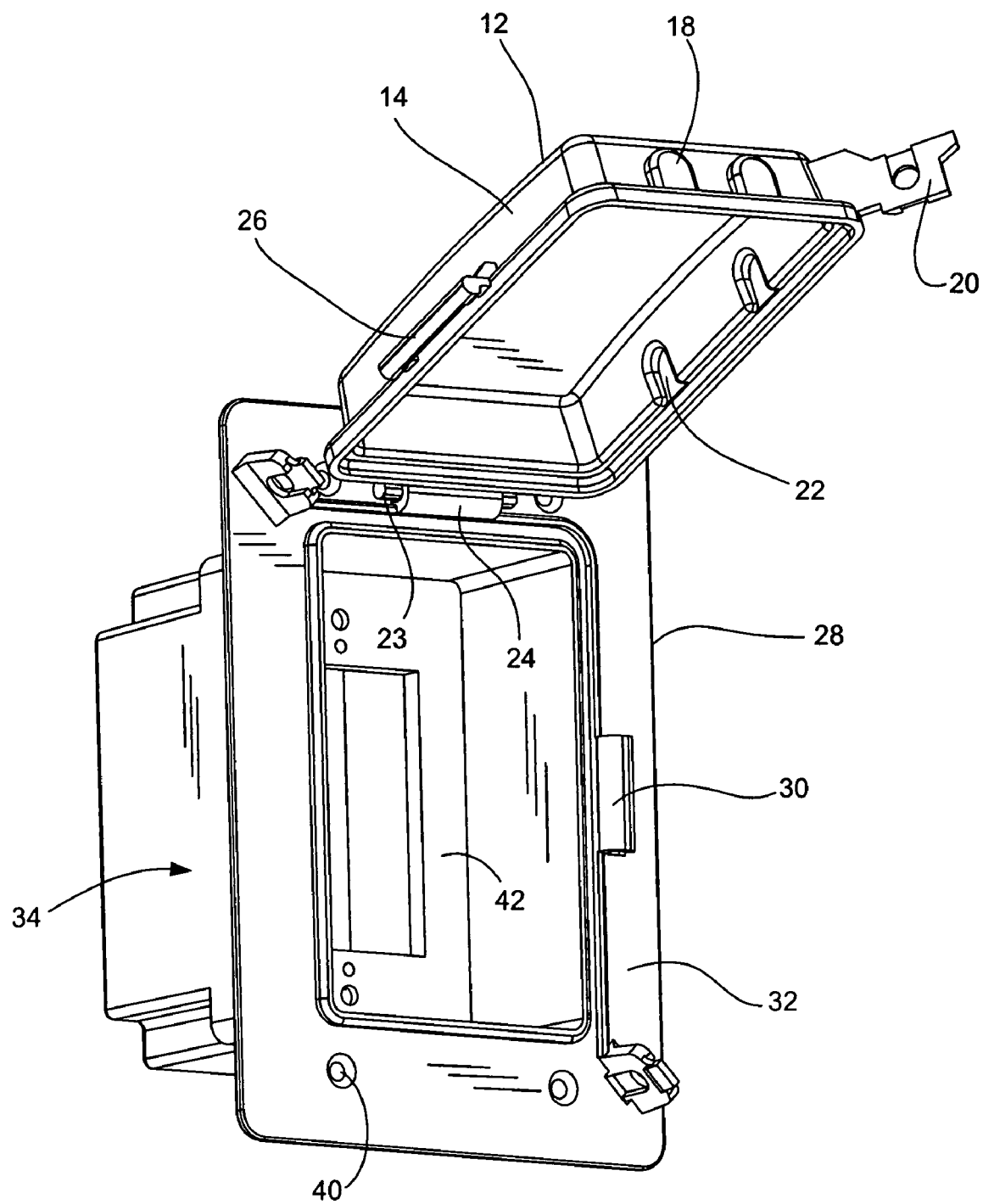
FIG. 2 is a perspective view of the electrical connector box and attached cover in a vertical open position, the adapter plate being recessed in the electrical connector box.
Figure 4:
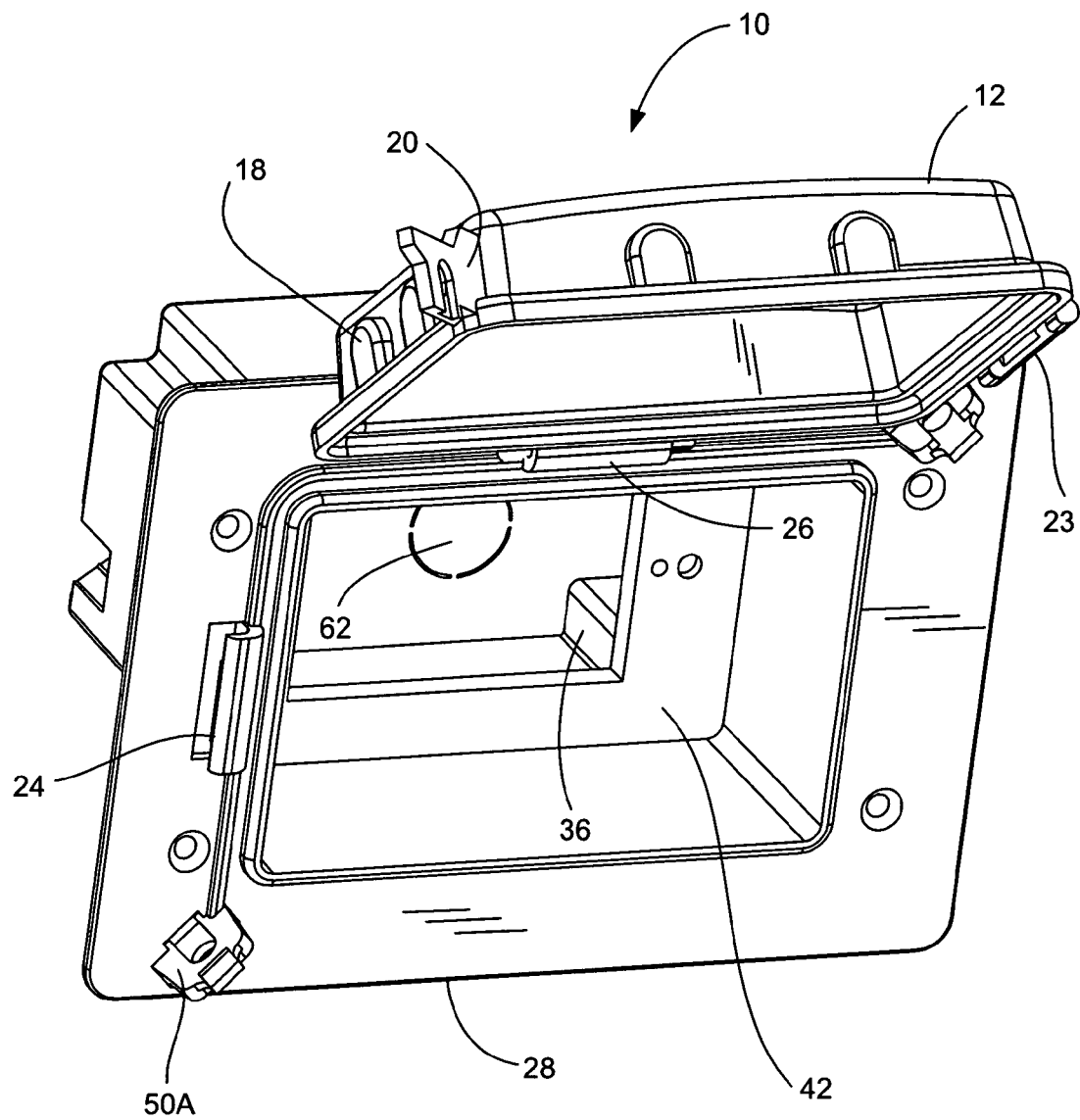
FIG. 4 is a perspective view of the electrical connector box and attached cover in a horizontal open position, the adapter plate being shown recessed in the electrical connector box.

Referring now to FIGS. 1, 2 and 4, the adapter plate 42 of the present invention is shown. The adapter plate 42 is a generally rectangular member having a substantially planar rectangular top surface that is perimetrically bounded by an outer wall 47. The outer wall 47 of the adapter plate 42 is of dimensions suitable for insertion and attachment to an inside recessed portion of the box 28. As shown in FIGS. 1 and 2, the adapter plate includes openings 48 for attaching an electronic component (not shown) to the adapter plate 42. For example, in one preferred embodiment, openings 48 are provided on the adapter plate 42 that are adapted to accept a screw to fasten an electronic component to the adapter plate 42. Preferably, the electronic component lies on top of the adapter plate 42. Afterwards a typical cover plate (not shown) covers both the electrical component and opening 46 in the normal fashion.

In one preferred embodiment, as shown in FIG. 1, the adapter plate 42 includes one or more tabs 44 extending perpendicularly from a back surface of the adapter plate 42. The distal end of each tab 44 may be used to secure the adapter plate 42 to an internal portion of the box 28. For example, in one preferred embodiment, as shown in FIGS. 1 and 6, recessed area 52 of the box 28 forms a shoulder 36 on an interior portion of the box 28. The shoulder 36 preferably includes an opening 38 that is adapted to receive the distal end of one of the tabs 44. Upon insertion of the distal end of one of the tabs 44 into the opening 38, the tab, and thereby the adapter plate 42 is engageably locked and secured to the shoulder 36 of the electrical connector box 28. Preferably, one of the distal ends of the tabs 44 is press-fit into the opening 38 and is releasably locked to a back portion of the opening 38.

One advantage of securing the adapter plate 42 to the shoulder 36, as shown in FIGS. 2 and 4, is that electrical components are thereby recessed in the box 28 and not positioned adjacent the face plate 32. As a result, electrical components may be further protected from any moisture accumulating on the inside cover area 16 of the cover 12 and face plate 32. Of course, it will be appreciated by one skilled in the art that other techniques may be used to secure the adapter plate 42 to the shoulder 36 of the box. For example, the adapter plate 42 may be secured to an internal portion of the box 28 via screws or via incorporating mechanical structure located on both the plate and the internal wall of the box.

The adapter plate 42 of the present invention is configured to accommodate any number of electrical components. For example, the adapter plate 42 can accommodate a single duplex receptacle mounted to threaded opening 48. Of course, it will be appreciated by one skilled in the art that the adapter plate 42 can also accommodate a variety of different components including GFCI receptacles or switches secured atop adapter plate 42. To finish installation, a typical cover plate is then installed over the electrical component in the usual manner.

In one preferred embodiment, the face plate 32 of the present invention is rigidly mounted to the open front of the electrical box 28 and is used to mount the electrical box assembly 10 on or in a wall. For example, as shown in FIG. 1, openings 40 are provided on the face plate 32 that allow the assembly 10 to be secured to a wall using fasteners, such as but not limited to, nails, screws and bolts. Preferably, the face plate 32 has a substantially planar rectangular top surface. The perimeter of the face plate 32 is generally greater than the perimeter of the box 28. For example, as shown in the figures, in one preferred embodiment, a back surface of the face plate 32 is attached to the front edges of the endwall portions 34B, 34C and sidewall portions 34A, 34D of the box 28 resulting in the perimeter of the face plate 32 being larger than the perimeter of the box 28.

As shown in the Figures, the face plate 32 preferably includes a vertical hinge socket 24 and a horizontal hinge socket 30 each extending respectively from a side edge of the box 28 and are configured in a substantially orthogonal orientation. Preferably, each of the hinge sockets 24, 30 is formed in an arched structure having an interior portion adapted to concentrically receive a hinge pin 23 or 26 of the cover 12.

Preferably, the face plate 32 also includes one or more face plate locking members 50A, 50B that may be used to lock the cover 12 to the face plate 32. Details of locking the cover 12 to the face plate 32 are discussed in connection with FIG. 3.

The cover 12 of the present invention is a generally rectangular box-like member having a substantially planar rectangular inner surface 16 that is perimetrically bounded by an outer wall 14. As shown in FIGS. 1 and 2, the outer wall 14 is comprised of four substantially planar side walls having two sets of substantially parallel sides. The outer wall 14 extends around and help define inner surface 16 and includes an outwardly flanged rim 15 extending from an end thereof. Preferably, the rim 15 is integrally formed on the cover 12 as a single piece component and operates to channel away any water that may fall on the cover 12 when the cover 12 is in the closed position.

In one preferred embodiment, as shown in FIGS. 1 and 2, the outer wall 14 of the cover 12 is configured to include one or more conventional plug knockouts 18, 22 of a type generally known in the art. Preferably, the knockouts 18, 22 are a partially cut through opening or removable wall section that create an opening through which a wire may pass for electrical connection to an enclosed electrical component.

Preferably, the outer wall 14 of the cover 12 is configured to include a vertical cover hinge pin 23 and a horizontal cover hinge pin 26 for pivotal engagement with the vertical hinge socket 24 and the horizontal hinge socket 30 of the face plate 32, respectively. For example, as shown in FIG. 1, the vertical hinge socket 24 is mounted on the face plate 32 such that the interior portion of the socket 24 is oriented towards the front of face plate 32. By mounting the vertical hinge socket in this way, the vertical cover hinge pin 23 can be rotatably engaged to the hinge socket 24. The cover 12 can thereby be pivoted to rotate into an open or closed position.

The cover 12 of the present invention also includes a locking device 20 that may be positioned in operative engagement with the face plate locking members 50A, 50B. As is well known in the art, the cover 12 may be formed of a variety of materials. For example, in one preferred embodiment, the cover 12 is integrally formed of an injection molded, high impact synthetic plastic material, such as for example, clear Lexan.

Figure 3:
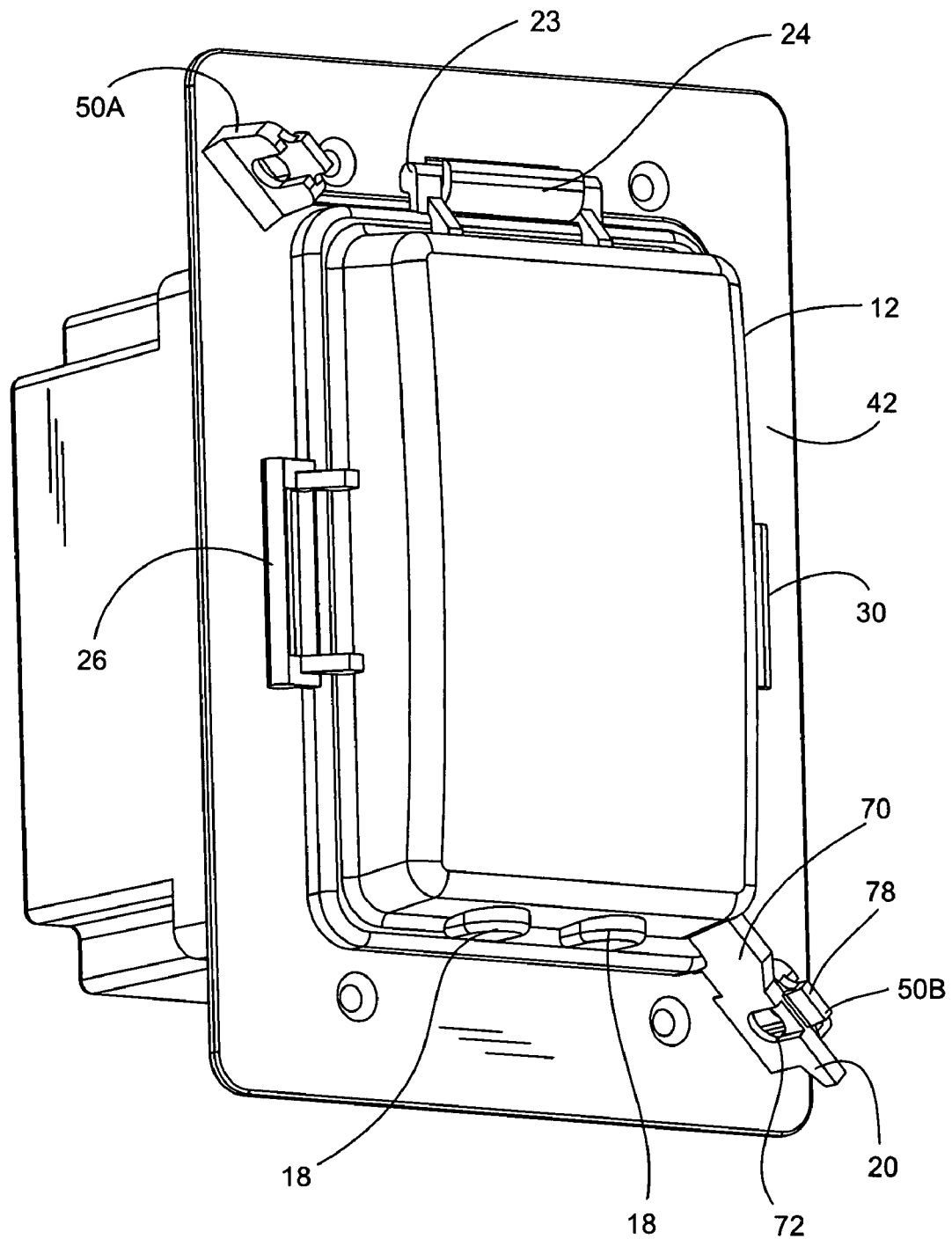
FIG. 3 is a perspective view of the electrical connector box and attached cover in a vertical closed position.

A perspective view of the cover 12 pivotally engaged to the face plate 32 in a closed vertical orientation is shown in connection with FIG. 3. In one preferred embodiment, the locking devices 50A and 50B extend from diagonally opposed sides of the face plate 32 and are adapted to be fastened to the cover locking device 20. As shown in the FIG. 3 example, when the electrical box assembly 10 is in the vertical closed position, the locking device 50B is in locking engagement with the cover locking device 20. As will be described and shown in connection with FIG. 4, the cover 12 can also be pivotally engaged to the face plate 32 in a horizontal orientation.

As shown in FIGS. 1 and 3, in one preferred embodiment, the cover locking device 20 comprises a stanchion 74 supporting an annular ring 76. The face plate locking device 50B comprises a support stanchion 70, an annular ring 72, and a locking tab 78. The annular ring 76 of the cover 12 is adapted to align concentrically with the complementary structure on the face plate locking device 50A or 50B, and provides a passage through which a conventional lock shank of a padlock or other locking device (not shown) may be inserted. The lock can be a padlock, opened by key or combination.

In operation, when the cover 12 is pivotally engaged to the face plate 32 and rotated to the vertical closed position, the cover locking device 20 passes the face plate locking device 50B and the locking tab 78 is elastically deformed laterally away from the locking device 50B until the cover 12 is in the fully closed position. Once the cover 12 is fully closed, the locking tab 78 flexes back to its original position to releasably secure the cover 12 on the face plate 32. At the same time, the annular rings 72, 76 are concentrically aligned to permit insertion of a lock such as a pad lock. To open the cover 12, the locking tab 78 is manually bent away from the locking device 50B thereby permitting opening of the cover 12. By providing the cover 12 and face plate 32 with a snap closure mechanism, the cover 12 can be closed securely and tightly, thus maintaining a tight seal between the cover 12 and face plate 32.

Figure 5:
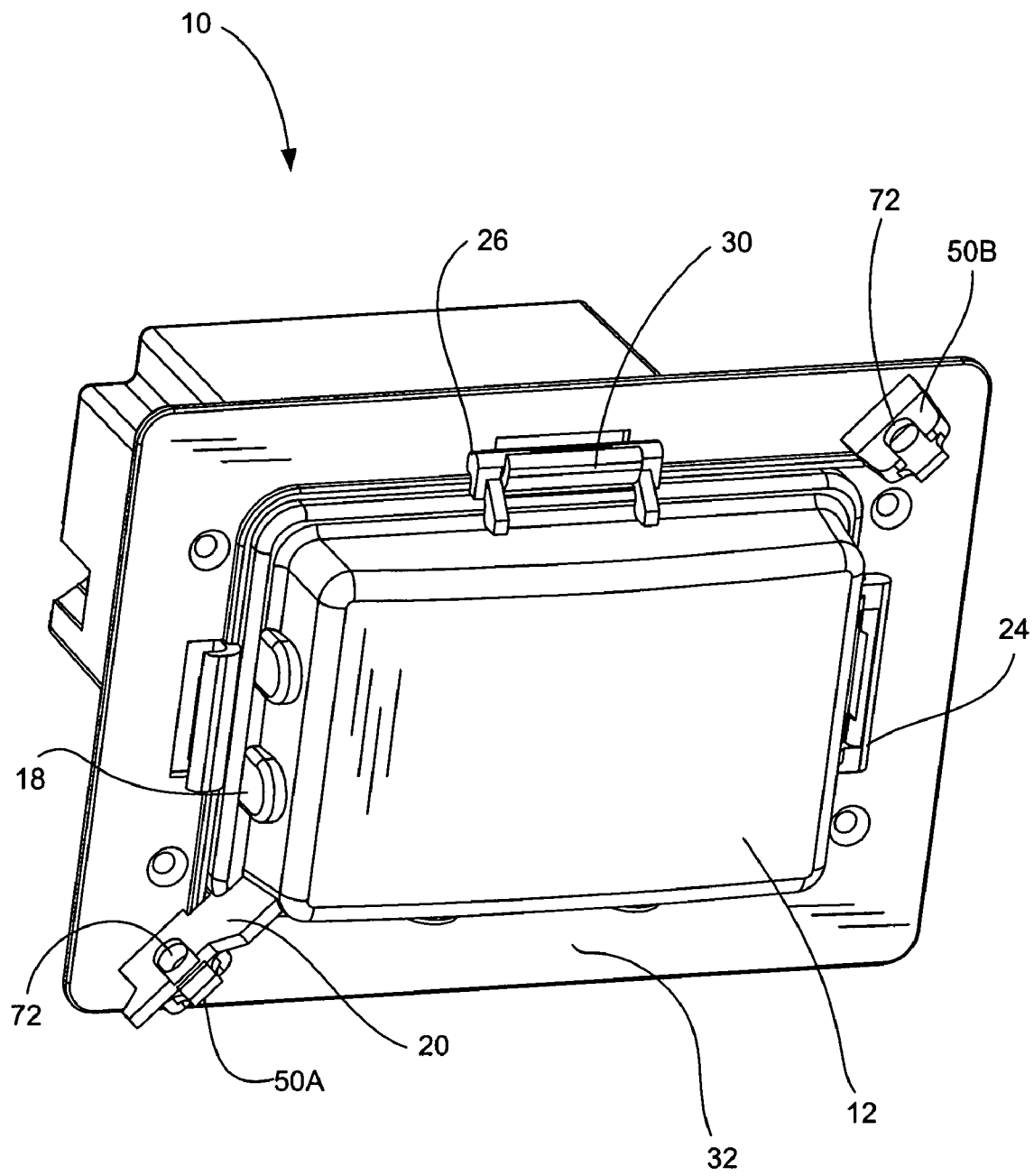
FIG. 5 is a perspective view of the electrical connector box and attached cover in a horizontal closed position.

Referring now to FIGS. 4 and 5, the electrical box assembly 10 arranged in an open and closed horizontal orientation, respectively, is shown. As shown in FIG. 4, the cover 12 is rotated 180 degrees from the vertical orientation depicted in FIGS. 1 and 2 with respect to face plate 32. In the horizontal orientation, the horizontal hinge pin 26 and horizontal hinge socket 30 are pivotally engaged. While in the horizontal position, the vertical hinge socket 24 and pin 23 are positioned along opposite parallel sides of the face plate 32 and cover 12, respectively. Such arrangement prevents the unused hinge components from interfering with the opening and closing of the cover 12. Furthermore, as shown in FIG. 5, in the horizontal closed position, the cover locking device 20 engages with the face plate locking device 50A. The face plate locking device 50B is not engaged in the horizontal orientation.

It should be understood that to affix the cover 12 to the face plate 32, either hinge socket 24, 30 is pivotally engaged to the corresponding horizontal 26 or vertical 23 hinge pin respectively. Furthermore, either set of hinges 24, 30 can be selectively engaged without the need to modify the adapter plate 42, face plate 32 or the cover 12. It should also be understood that other intermating structure are equally suitable such that the described pin and socket interconnection is not the only structure usable for securing the cover 12 to the face plate 32. Further, either inter-mating structure may be formed on either face plate 32 or cover 12.

For example, in one preferred embodiment, the pin structure described is secured to the face plate and the socket structure described previously is secured to the cover. Bayonet, ball, as well as male/female structures are equally suitable for this purpose. Furthermore, there is no necessity that the intermating structure on the face plate 32 be the same nor is there any necessity that the intermating structure on the cover 12 be the same. It is only necessary that the respective intermating structure on the cover and face plate be configured to engage each other.

In the preferred embodiment of the present invention, the face plate and cover are mounted such that the cover opens by pivoting in an upward direction. For example, the face plate may be mounted to the box with either a vertical or horizontal hinge socket positioned at the top wherein the corresponding cover hinge pin is pivotally engaged to that socket. Alternately, it is also possible to open the cover in a downward or lateral direction by positioning a hinge socket at the bottom or side of the face plate respectively, and pivotally engaging the corresponding hinge socket. Either orientation can be achieved without any modification to the positioning of the adapter plate.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. An outdoor electrical box assembly for shielding and protecting electrical components from moisture comprising: an electrical box comprising four side walls extending from a back wall to a face plate and defining an interior, wherein said face plate has an opening defined by four sides for accessing said interior and at least a first hinge socket and a second hinge socket, and wherein said first and second hinge sockets are located on adjacent sides of said opening; a shoulder recessed in said interior; an adapter plate recessed in said interior of said electrical box, wherein said adapter includes at least one tab that extends from a back surface of said adapter plate to engage said shoulder of said electrical box, wherein, upon engagement of said at least one tab with said shoulder, said adapter place is removably secured to said box; and a cover having a plurality of hinge pins for operable engagement with said hinge sockets.

2. The outdoor electrical box assembly of claim 1, wherein said adapter plate is substantially planar, and includes a perimeter bounded by a substantially rectangular side edge.

3. The outdoor electrical box assembly of claim 2, wherein said adapter plate includes at least one aperture for receiving an electrical component.

4. The outdoor electrical box assembly of claim 1, wherein said electrical box comprises at least one knockout for receiving and attaching an electrical wire to an electrical component.

5. The outdoor electrical box assembly of claim 1, wherein a bottom portion of said electrical box includes a V-shaped slot that is adapted to receive at least one electrical wire for attachment to at least one electrical component.

6. The outdoor electrical box assembly of claim 1, wherein a said back wall of said electrical box comprises one or more knockouts that are adapted to receive electrical wires for attachment to an electrical component.

7. The outdoor electrical box assembly of claim 6, wherein said electrical box comprises a V-shaped slot that is adapted to receive said electrical wires.

8. The outdoor electrical box assembly of claim 1, wherein said cover comprises a front wall, an opposed open end and a substantially rectangular side wall defining a cover interior.

9. The outdoor electrical box assembly of claim 8, wherein said side wall includes a rim bounding said open end.

10. The outdoor electrical box assembly of claim 9, wherein said cover comprises at least one access port through said side wall adjacent said open end for providing separate passageways into said interior of said cover.

11. The outdoor electrical box assembly of claim 1, wherein said cover comprises a front wall, an opposed open end and a substantially rectangular side wall defining a cover interior, wherein said cover further comprises a first hinge pin and a second hinge pin extending respectively from said side wall adjacent said open end in substantially orthogonal orientation, said cover being pivotally affixed to said box by operative engagement of said first or second hinge socket with said first or second hinge pin of corresponding orientation and movable between an open and a closed position and wherein said first or second hinge pin and said first or second hinge socket that are not in operative engagement are not aligned.

* * * * *

UNITED STATES PATENT AND TRADEMARK OFFICE
CERTIFICATE OF CORRECTION

PATENT NO. : 7,462,777 B2  Page 1 of 1
APPLICATION NO. : 11/800945
DATED : December 9, 2008
INVENTOR(S) : Cong Thanh Dinh It is certified that error appears in the above-identified patent and that said Letters Patent is hereby corrected as shown below:

Column 6, line 47,   now reads:   "adapter place"
                     should read: -- adapter plate --

Column 6, line 65,   now reads:   "a said back"
                     should read: -- said back --

Signed and Sealed this

Sixteenth Day of June, 2009

JOHN DOLL
*Acting Director of the United States Patent and Trademark Office*